United States Patent
Knoethig et al.

(10) Patent No.: US 6,488,312 B2
(45) Date of Patent: Dec. 3, 2002

(54) DEFORMATION ELEMENT

(75) Inventors: Holger Knoethig, Osnabrueck (DE); Markus Zerull, Osnabrueck (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 7 days.

(21) Appl. No.: 09/727,939

(22) Filed: Nov. 30, 2000

(65) Prior Publication Data
US 2002/0125707 A1 Sep. 12, 2002

(30) Foreign Application Priority Data
Dec. 3, 1999 (DE) .......................................... 199 58 299

(51) Int. Cl.⁷ .............................................. B60R 21/04
(52) U.S. Cl. ....................................... 280/751; 296/188
(58) Field of Search ................................. 280/751, 752, 280/784; 296/187, 188, 189, 203.02, 203.03, 39.1; 188/371, 377

(56) References Cited

U.S. PATENT DOCUMENTS

| | | | | | |
|---|---|---|---|---|---|
| 3,506,295 A | * | 4/1970 | Yancey | ...................... | 293/133 |
| 4,227,593 A | * | 10/1980 | Bricmont et al. | ........... | 188/377 |
| 5,564,744 A | * | 10/1996 | Frost | ......................... | 280/751 |
| 5,609,385 A | * | 3/1997 | Daniel et al. | ................ | 296/188 |
| 5,660,426 A | * | 8/1997 | Sugimori et al. | ........... | 296/189 |
| 5,762,392 A | * | 6/1998 | Suga | .......................... | 296/39.1 |
| 5,833,304 A | * | 11/1998 | Daniel et al. | ............... | 296/214 |
| 6,145,921 A | * | 11/2000 | Cho | ............................ | 296/188 |
| 6,247,287 B1 | * | 6/2001 | Takabatake | ................ | 52/731.6 |

FOREIGN PATENT DOCUMENTS

DE 198 25 040 A1 * 3/1999

* cited by examiner

Primary Examiner—Peter C. English
Assistant Examiner—David R. Dunn
(74) Attorney, Agent, or Firm—Jordan and Hamburg LLP

(57) ABSTRACT

Deformation element for the interior of motor vehicles which is constructed as a ledge and is deformable over its length. The deformable element may be mounted in hollow spaces between body parts of the vehicle, such as vehicle columns, and an inner lining. The ledge is adapted to the outer outline configuration of the body parts and has several deformable regions over its length. The deformable regions are formed by strips oriented in a longitudinal direction of the ledge. The strips are curved in a wave-shaped form in the longitudinal direction and each includes at least one wave crest and one wave trough. Adjacent strips are offset in a longitudinal direction relative to one another such that a wave crest on one strip is adjacent a wave trough on an adjacent strip and vice versa.

20 Claims, 6 Drawing Sheets

DEFORMATION ELEMENT

BACKGROUND OF THE INVENTION

Figure 1:
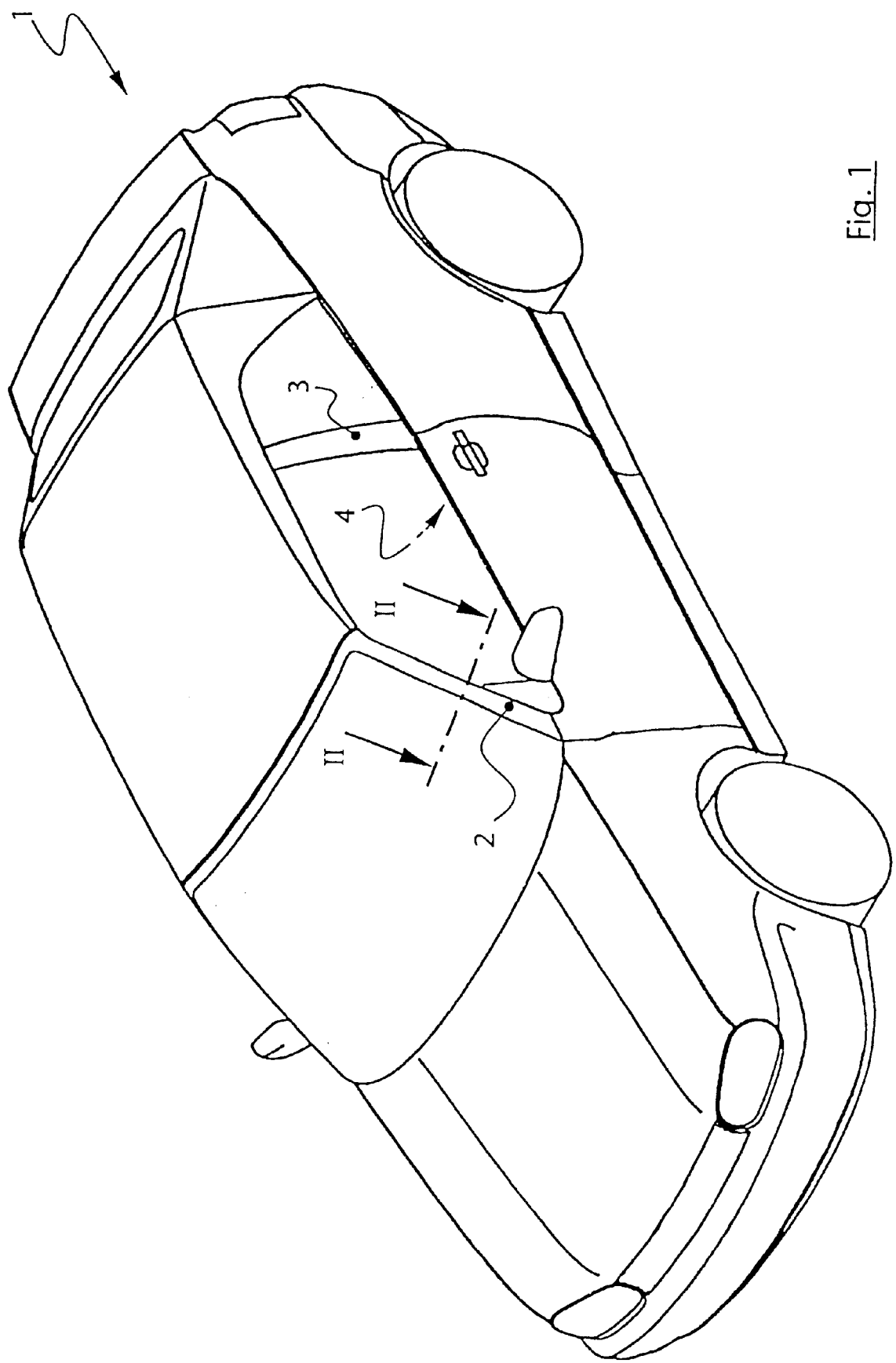

The invention relates to a deformation element for the interior of motor vehicles.

German Patent Publication No. DE 198 25 040 A1 (corresponding to U.S. Pat. No. 6,145,921) shows a shock-absorbing device which comprises a support, which is essentially L-shaped in plan view, and embraces a car body column and is kept at a distance from the car body column by means of a deformable leaf spring structure. The leaf spring structure is constructed so that it has two mutually intersecting semicircular bridge elements, which are offset from one another by 180° and held one above the other, the plane of the semicircles being essentially perpendicular to the plane of the vehicle column. With such a shock-absorbing device, it is possible to counteract only an impact force, which acts essentially in a direction perpendicular to the line of intersection of the two semicircular bridge elements on the device. There is therefore only a pointwise spring system.

SUMMARY OF THE INVENTION

It is an object of the invention to provide an improvement thereof.

The inventive deformation element is deformable as a whole over its longitudinal extent so that as a result, it can cover a wide region of the outline configuration of the body part of the car and, in this region, functions as an impact protection device. Several deformable regions are available so that forces introduced at different places on the car body and from different directions can be intercepted and the deformation element provides protection in the case of a frontal accident as well as in the case of a side crash or if the vehicle overturns. In each of these cases, the points of impact and the directions in which the forces are introduced are different.

A high stability of the deformation element is achieved since in the case of an impact, the direction in which the force is introduced would extend essentially in the plane in which the reinforcing skins extend. Even if only one deformable region is constructed from a wave crest opposite a wave trough, a stability, better than that of the state of the art, would be achieved therewith by the stiffening skin even when the forces are introduced from different directions. This embodiment is realized particularly advantageously also within a deformable longitudinal strip which is fitted to the respective car body structure.

Elastically deformable pins are provided as energy absorbers and exhibit a relatively high energy absorption even in the case of obliquely introduced forces and lateral kinking, so that the passenger protection is improved also in this embodiment. In particular, advantages arise also here when several regions carrying such pins are connected with one another and adapted as a whole to the shape of the body.

Further advantages and distinguishing features arise out of the examples of the object of the invention, which are explained in the following and shown in the accompanying drawings.

IN THE DRAWINGS

Figure 2:
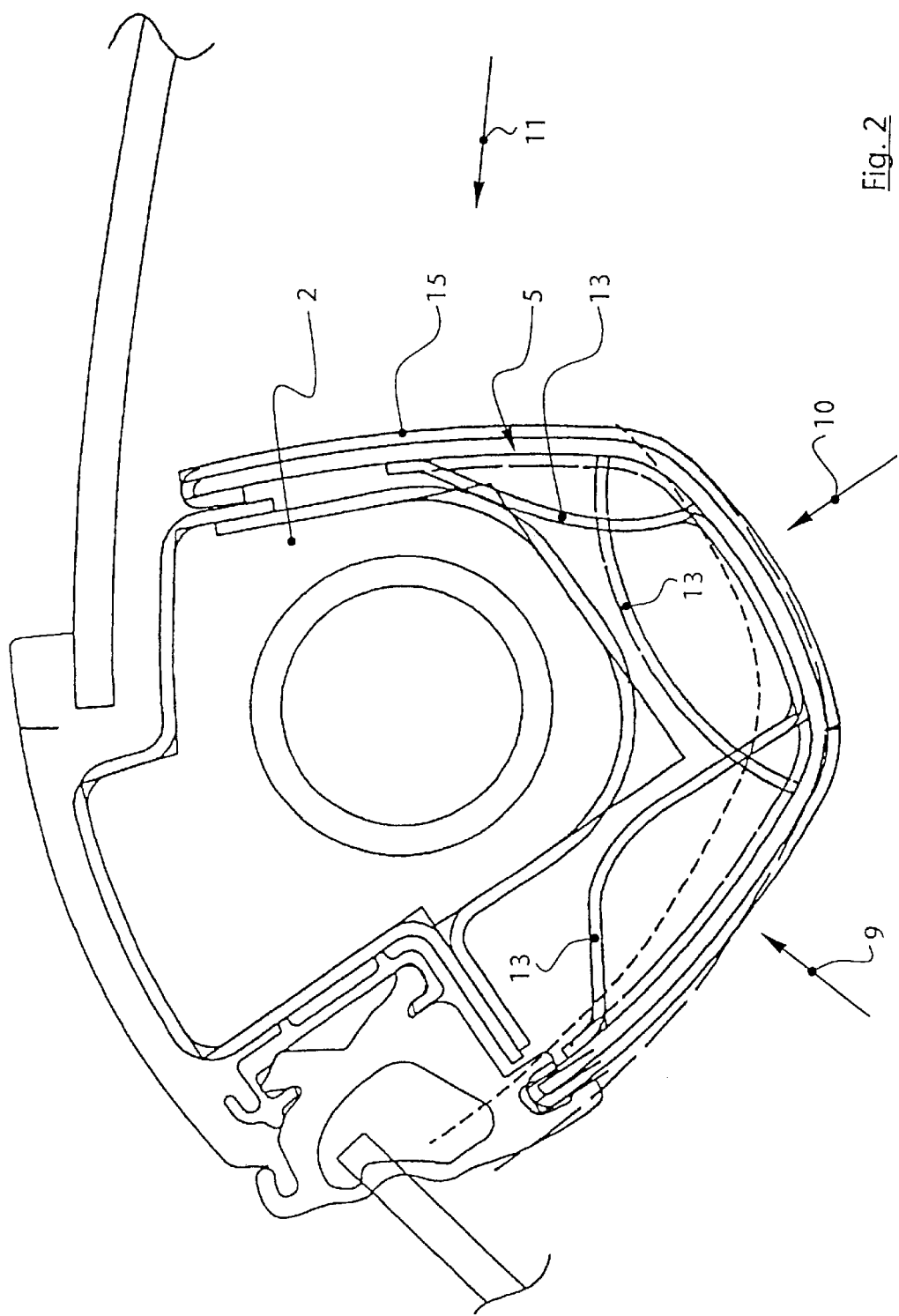
Figure 3:
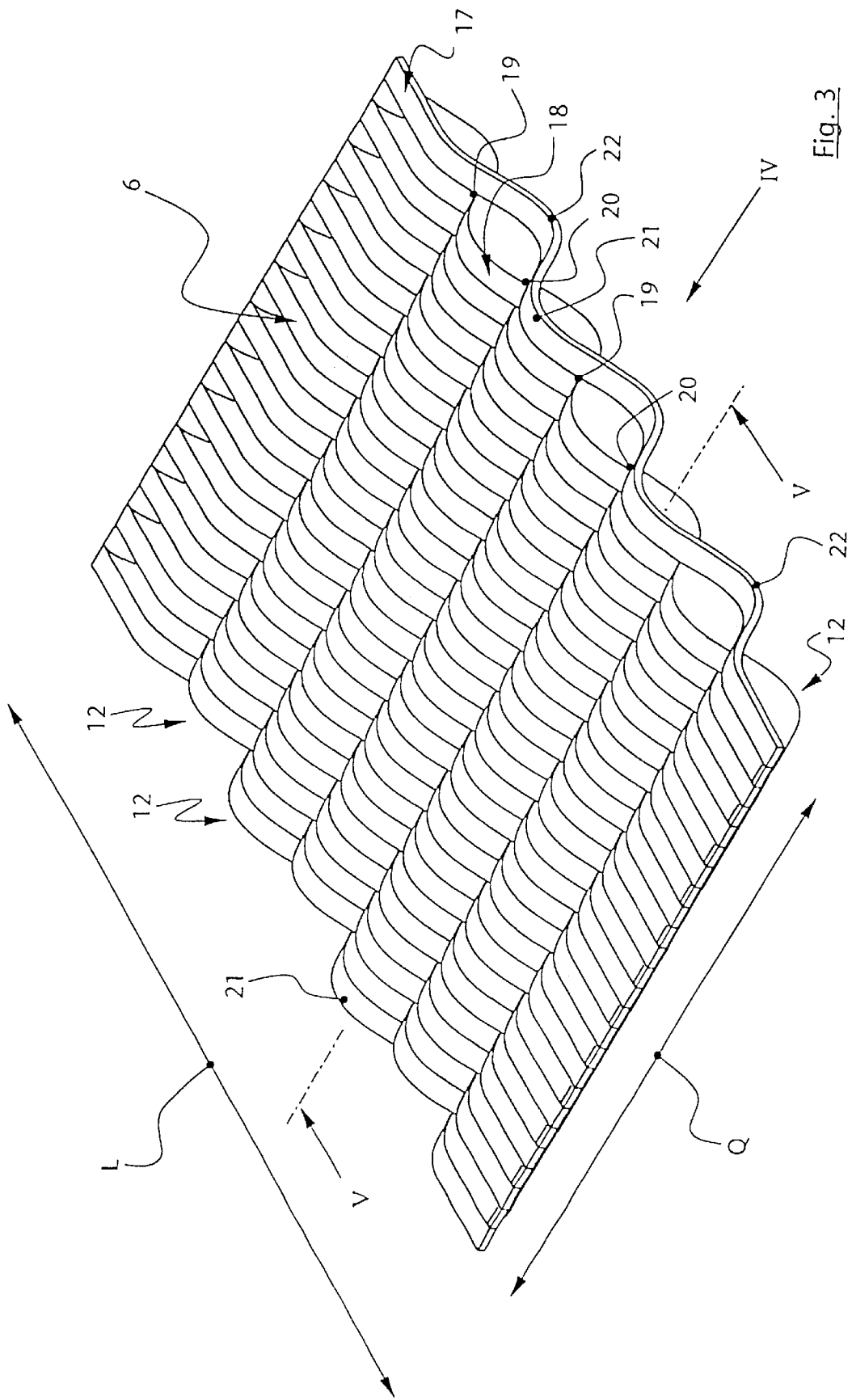
Figure 4:
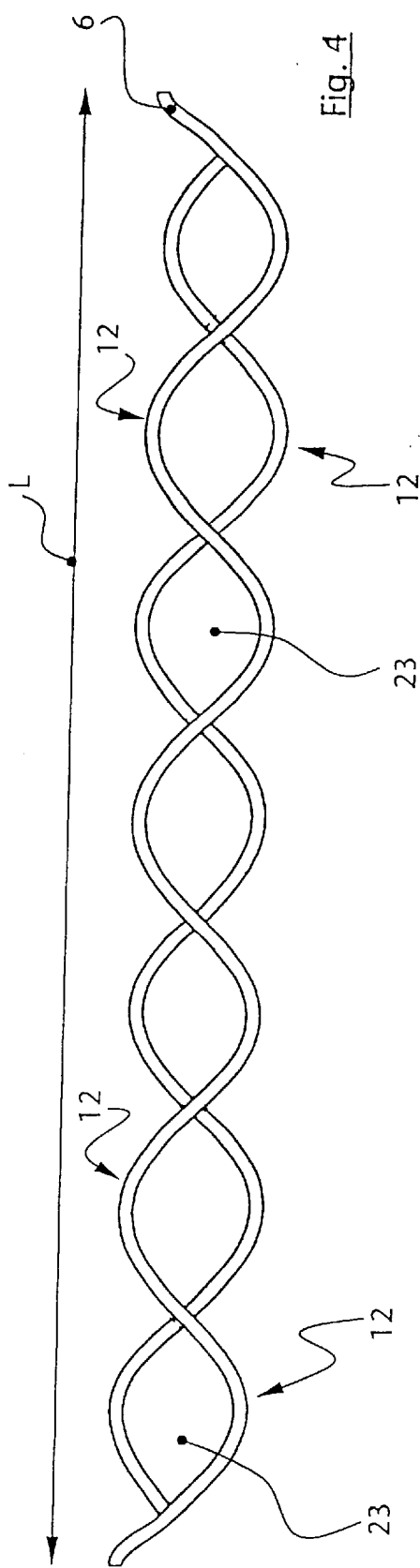
Figure 5:
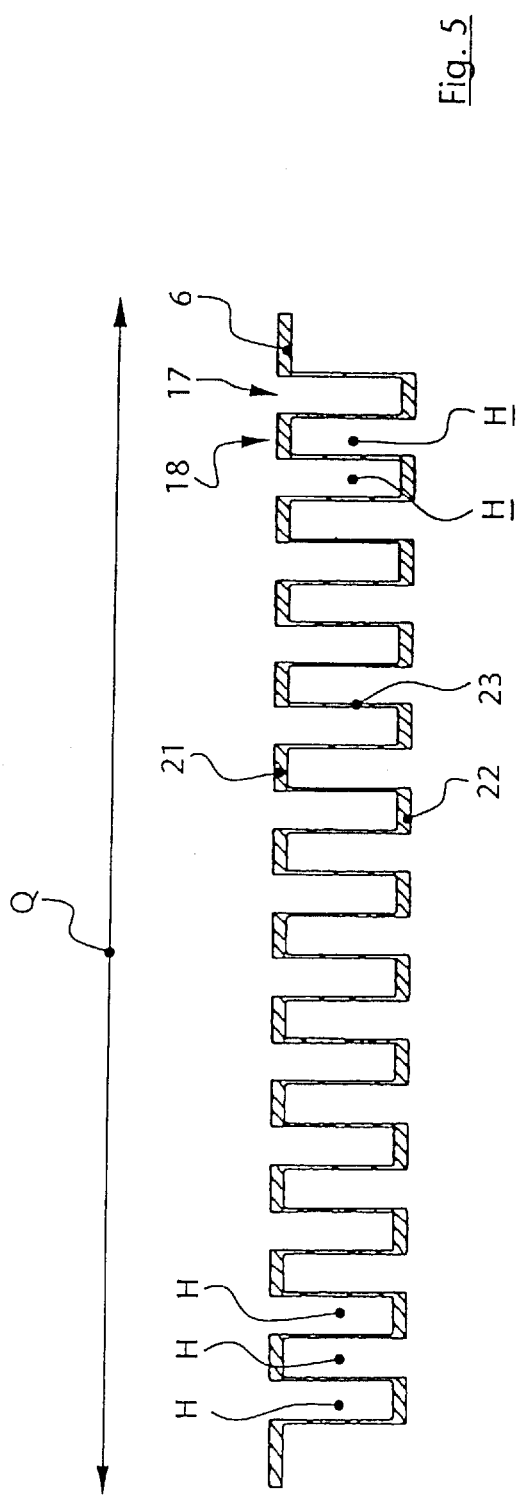
Figure 6:
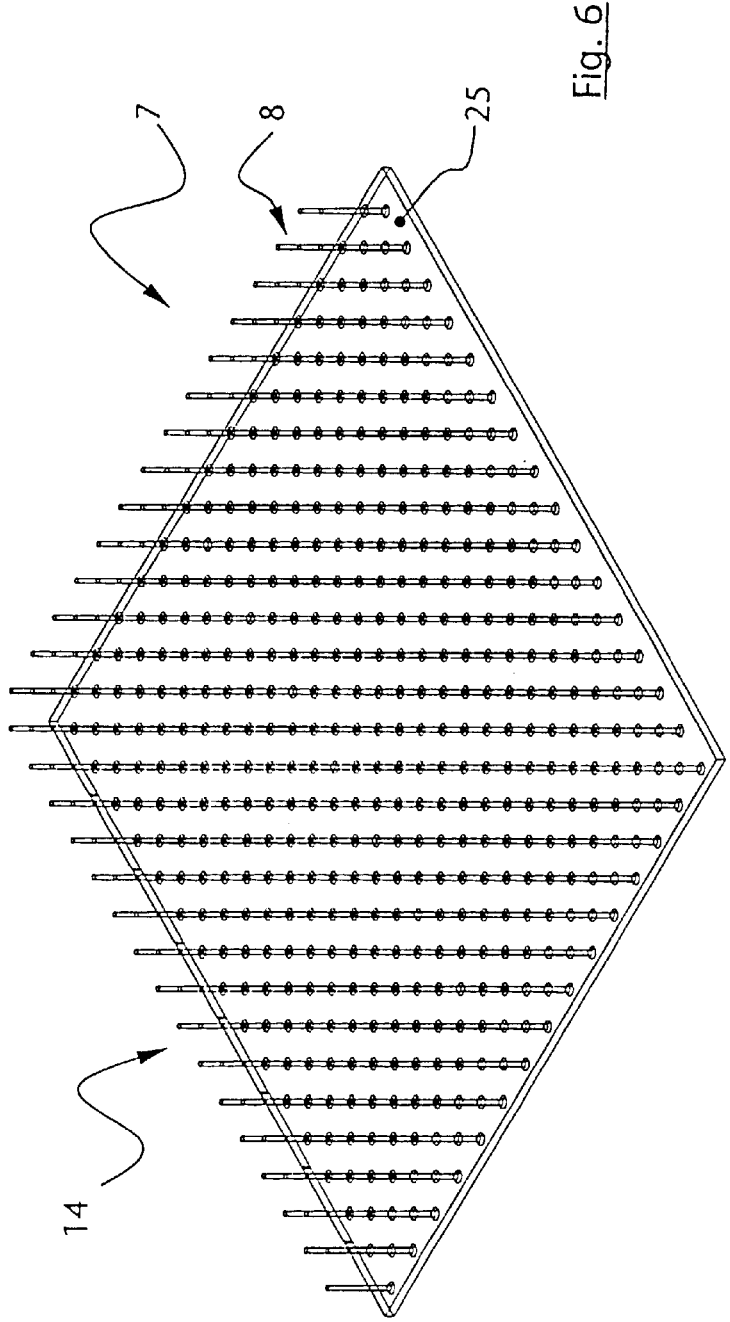
Figure 7:
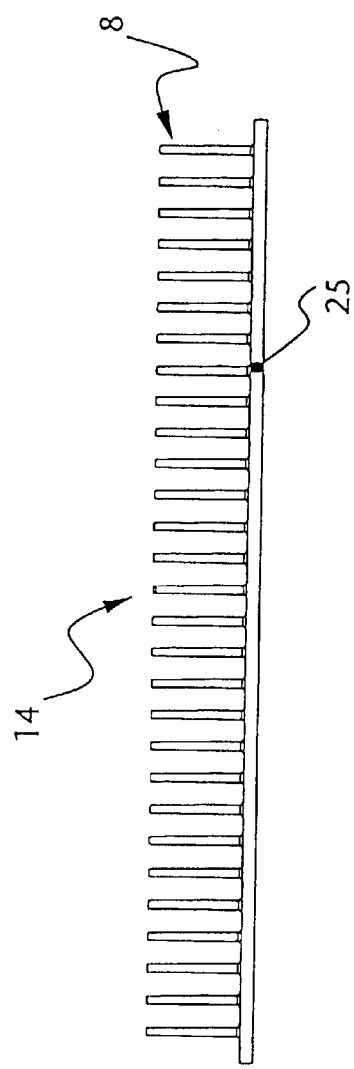
Figure 8:
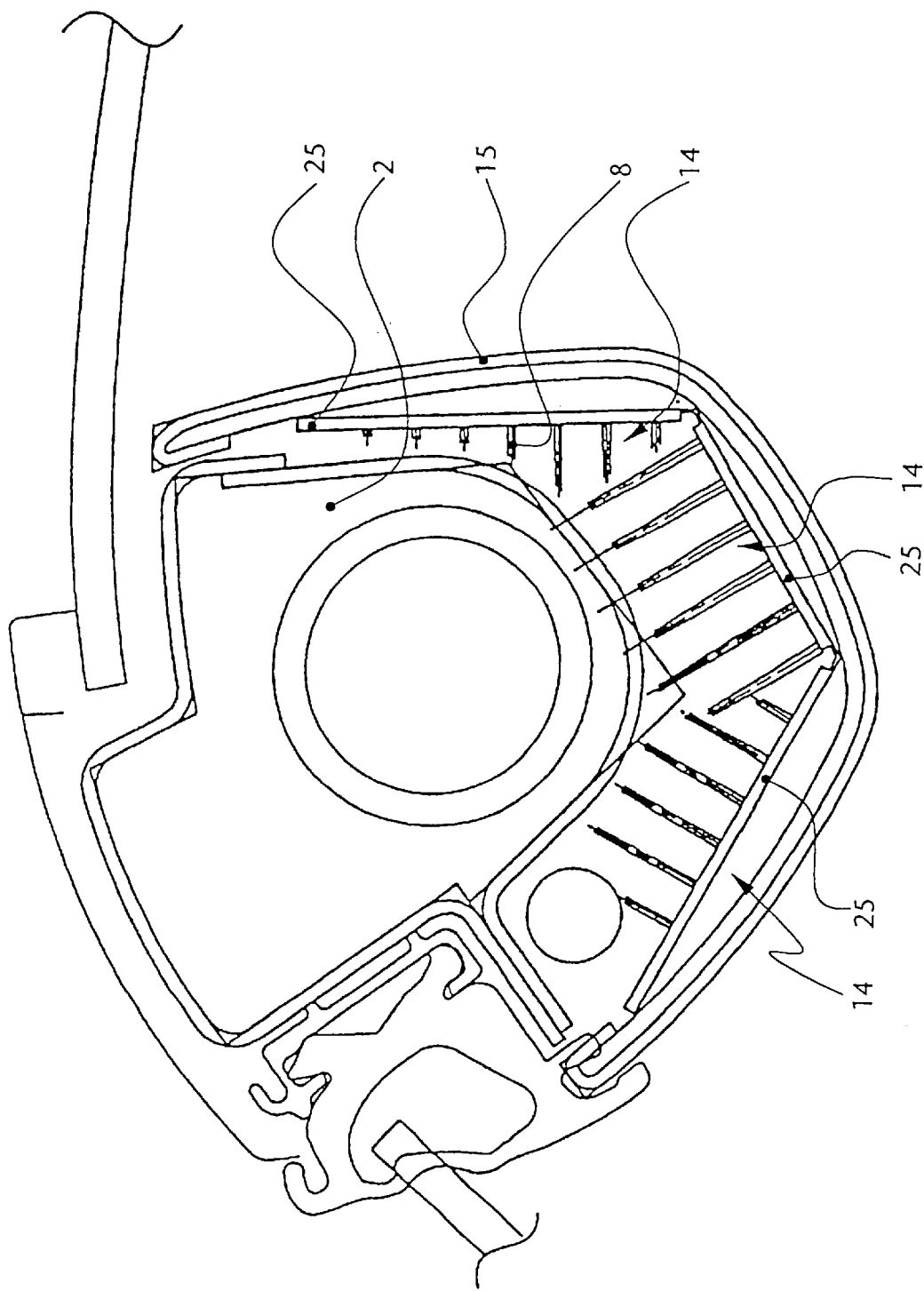

FIG. 1 shows a motor vehicle with body columns, to which inventive deformation elements are assigned, FIG. 2 shows a section along the line II—II in FIG. 1, FIG. 3 shows a deformation element in accordance with one embodiment of the invention, FIG. 4 shows a view from the direction IV onto the first material strip of the deformation element of FIG. 3, FIG. 5 shows a section along the line V—V in FIG. 3, FIG. 6 shows a prospective plan view of a deformation element in accordance with a second embodiment of the invention, FIG. 7 shows a side view of the second embodiment shown in FIG. 6, and FIG. 8 shows a view, similar to that of FIG. 2, of the second embodiment of the deformation element in accordance with the invention.

DESCRIPTION OF THE PREFERRED EMBODIMENTS

FIG. 1 shows a motor vehicle 1 which can be constructed as a closed vehicle or as a convertible and includes an A column or pillar 2, a rollover hoop 3 and other interior parts 4 of the door or parts of the body of the vehicle adjoining the interior. The A column 2, rollover hoop 3 or other parts 4 include deformation elements 5, 6, 7, which differ depending on the part and are provided and constructed in each case as ledges and have several deformable regions 12, 13, 14 along a longitudinal extent or length L (see FIGS. 2, 3 and 4). The ledges may have a transverse extent or width Q which exceeds the longitudinal length L. Several deformation elements 5, 6, 7 may also be disposed next to one another so as to offer a complete protection over the length or longitudinal extent of the car body part 2, 3, 4. The deformation elements 5, 6, 7 are deformable as a whole in such a manner over their length, that they can be placed around a body part, deformed about a vehicle column 2, 3 or an edge of the door lining 4 or the like, in order to form an intermediate layer from different sides between the body part 2, 3, 4 and an outer lining 15, facing the interior of the vehicle. The deformation of the ledges 5, 6, 7 over their longitudinal length may be either elastic or regionally plastic. In each case, adaptation to the shape of the car body part 2, 3, 4 is achieved. The deformable regions 12, 13, 14 are constructed such that they can develop a resistance and absorb energy by deformation when placed essentially perpendicular to the outer wall of the car body part 2, 3, 4, that is, parallel to possible directions 9, 10, 11, in which forces are introduced. The ability to develop a resistance and absorb energy by deformation counteracts the force introduced from the outside, for example, by impact with a person or an object.

In FIG. 2, a deformation element 5 with 3 deformable regions is shown. The deformation element 6, shown in FIGS. 3–5 has considerably more deformable regions 12. For example, the deformable regions 12 can in each case have a length of about 2 to 3 cm and a ledge typically can have five to eight such deformable regions 12.

In the embodiment shown in FIGS. 3–5, the deformation element 6 is formed by several strips 17, 18 which are placed parallel to one another and parallel to the longitudinal dimension of the ledge. The strips 17, 18 extend periodically in the longitudinal direction and, moreover, are curved in an undulating or wave-like manner. The strips 17, 18 are connected with one another at crossing points 19, 20 lying in their central plane and in each case form wave crests 21 and wave troughs 22. Adjacent strips 17, 18 have a phase difference of 180°, that is, in each case, one wave trough 22 of a strip 17 strikes a wave crest 21 of an adjacent strip 18 and the vice versa. The deformation element 5 or 6 may be constructed as a one-piece component, for example, as an injection-molded part. Different plastics come into consideration. Basically, metallic materials are also possible. Preferably, the deformation element 5, 6, 7 is constructed so that the deformation is elastic over the largest possible region, that is, in the case of a slight impact, the component is regenerated and therefore not permanently damaged.

In order to stiffen it, the deformation element 6 contains thin stiffening skins 23, in each case closing off the passages or free spaces H between the mutually adjacent wave crests 21 and wave troughs 22, so that, when looking in the direction of the arrow IV, there are only filled-up area regions and no free spaces between the wave crests 21 and the wave troughs 22. During the deformation, these offer appreciable resistance so that such deformation elements 6, in comparison to those with interstices left free, have a greater hardness and power of resistance. The deformation elements 6 can also be constructed as one-piece injection molded parts. Such deformation elements 6 offer a considerable improvement over the state of the art even in the case of only one wave crest 21 and one wave trough 22, since they can intercept the deformation from various directions and offer a considerable stiffening even when a force is introduced obliquely. Preferably, these deformation elements 6 are also constructed as longitudinally extended ledges, which comprise several deformable regions 12. The stiffening skins 23 extend at right angles to the strips 17 or 18. The strips 17, 18 are firmly connected to one another over the stiffening skins 23, the connection being continuous over all strips 17, 18 extending in the longitudinal direction.

In accordance with a further embodiment (FIGS. 6 to 8), the deformation element 7 comprises one or more flat supporting region or regions 25, from which pins 8 extend, which can be deformed essentially perpendicularly and elastically and, in the installed position, face the car body part 2, 3, 4. As shown in FIGS. 6 and 7, the pins 8 may all have a uniform length or, as shown in FIG. 8, the pins 8 may have different lengths in adaptation to the width of the interstices between the car body part 2, 3, 4 and an outer lining 15. Even in the case of a single flat region 25, forces introduced from different directions 9, 10, 11 can be intercepted because of the plurality of the pins 8. In every case, several pins 8 are deformed. The forces are introduced at several places and therefore not only pointwise at one place. The deformable region 14 extends over the whole of the distribution of the pins 8.

In the embodiment of FIG. 8, several flat regions 25 are provided which are connected with one another over film hinges and are disposed essentially semicircularly about a vehicle column 2, 3. Such a component can also be formed in one piece as an injection molded part. The deformation of the pins 8 preferably is also elastic in order to enable the recovery of the components after an impact. Here, as in the case of the other embodiments described herein, provisions can be made so that when a limiting force is exceeded, plastic deformation sets in.

What is claimed is:

1. A deformation element for a vehicle interior, comprising
   a ledge adapted to an outline configuration of a car body part, said ledge including deformable regions over a longitudinal extent thereof,
   said deformable regions being formed by strips oriented in a longitudinal direction of said ledge,
   said strips being curved in a wave-shaped form in the longitudinal direction of said ledge such that each of said strips includes at least one wave crest and at least one wave trough,
   adjacent ones of said strips being offset in the longitudinal direction relative to one another such that a wave crest of one of said strips is adjacent to a wave trough of an adjacent one of said strips and a wave trough said one of said strips is adjacent to a wave crest of said adjacent one of said strips.

2. A deformation element according to claim 1, wherein said ledge is suitably configured for mounting in a hollow space between vehicle body parts.

3. A deformation element according to claim 2, wherein the vehicle body parts include a vehicle column and an inner lining.

4. A deformation element according to claim 1, wherein the deformable regions present a resistance crosswise to an outer wall of a car body part surrounded by said ledge.

5. A deformation element according to claim 4, wherein the resistance is presented approximately perpendicular to the outer wall.

6. A deformation element according to claim 1, wherein said ledge is adapted to extend approximately semicircularly about a vehicle column over the longitudinal extent thereof when situated in an installed position.

7. A deformation element according to claim 1, wherein said ledge includes deformable regions over its entire length.

8. A deformation element according to claim 1, wherein said ledge has a plurality of deformable regions spaced from one another in the longitudinal direction of said ledge.

9. A deformation element according to claim 1, wherein said strips are connected to one another at crossing points in a central plane between said wave crests and said wave troughs.

10. A deformation element according to claim 1, wherein each of said strips includes two wave crests and a wave trough arranged between said two wave crests.

11. A deformation element according to claim 1, wherein crossing points are defined between said adjacent strips with said wave crest and adjacent wave trough are situated between said crossing points in the longitudinal direction of said ledge, further comprising stiffening skins each extending over a space between an adjacent wave crest and wave trough and connecting an edge of said wave crest between said crossing points to an edge of said adjacent wave trough between said crossing points to thereby close a passage defined between said wave crest and said adjacent wave trough in a direction transverse to the longitudinal direction of said ledge.

12. A deformation element according to claim 1, wherein adjacent ones of said strips are connected directly to one another at crossing points such that spaces are formed between each wave crest and adjacent wave trough on adjacent ones of said strips and between a pair of crossing points, further comprising stiffening skins each arranged in a respective space between a wave crest and adjacent wave trough on adjacent ones of said strips and between a pair of crossing points to thereby seal said space.

13. A deformable element according to claim 1, further comprising thin stiffening skins extending between a wave crest of one of said strips and an adjacent wave trough on an adjacent one of said strips and being perpendicular to said strips.

14. A deformation element for a vehicle interior, comprising:
   a ledge which is formed by at least two strips which extend parallel to one another in a longitudinal direction of said ledge, said at least two strips being curved in an undulating fashion in the longitudinal direction and being offset in the longitudinal direction relative to one another such that a wave crest of one of said at least two strips is adjacent to a wave trough of an adjacent one of said at least two strips and vice versa and crossing points are defined between said adjacent strips with said wave crest and adjacent wave trough being situated between said crossing points in the longitudinal direction of said ledge; and stiffening skins each extending over a space between an adjacent wave crest and wave trough and connecting an edge of said wave crest between said crossing points to an edge of said adjacent wave trough between said crossing points to thereby close a passage defined between said wave crest and said adjacent wave trough in a direction transverse to the longitudinal direction of said ledge.

15. A deformation element according to claim 14, wherein said stiffening skins extend orthogonally from edges of each of said strips and, between one another, form hollow spaces having approximately a width of each of said strips.

16. A deformation element according to claim 14, wherein said stiffening skins firmly interconnect said strips with one another and form a continuous connection between all of said strips extending in the longitudinal direction of said ledge.

17. A deformable element according to claim 14, wherein each of said strips includes two wave crests and a wave trough arranged between said two wave crests.

18. A deformable element according to claim 14, wherein said ledge has a plurality of deformable regions spaced from one another in the longitudinal direction of said ledge, said deformable regions being formed by said strips.

19. A deformation element for a vehicle interior, comprising:

a ledge which is formed by at least two strips which extend parallel to one another in a longitudinal direction of said ledge, said at least two strips being curved in an undulating fashion in the longitudinal direction and being offset alternatingly to one another such that a wave crest of one of said at least two strips is adjacent to a wave trough of an adjacent one of said at least two strips and vice versa; and stiffening skins each extending over a space between an adjacent wave crest and wave trough, said stiffening skins extend orthogonally from edges of each of said strips and, between one another, form hollow spaces having approximately a width of each of said strips.

20. A deformation element according to claim 19, wherein said stiffening skins firmly interconnect said strips with one another and form a continuous connection between all of said strips extending in the longitudinal direction of said ledge.

* * * * *